No. 853,123. PATENTED MAY 7, 1907.
T. J. SAYERS.
CAR FENDER.
APPLICATION FILED OCT. 13, 1906.
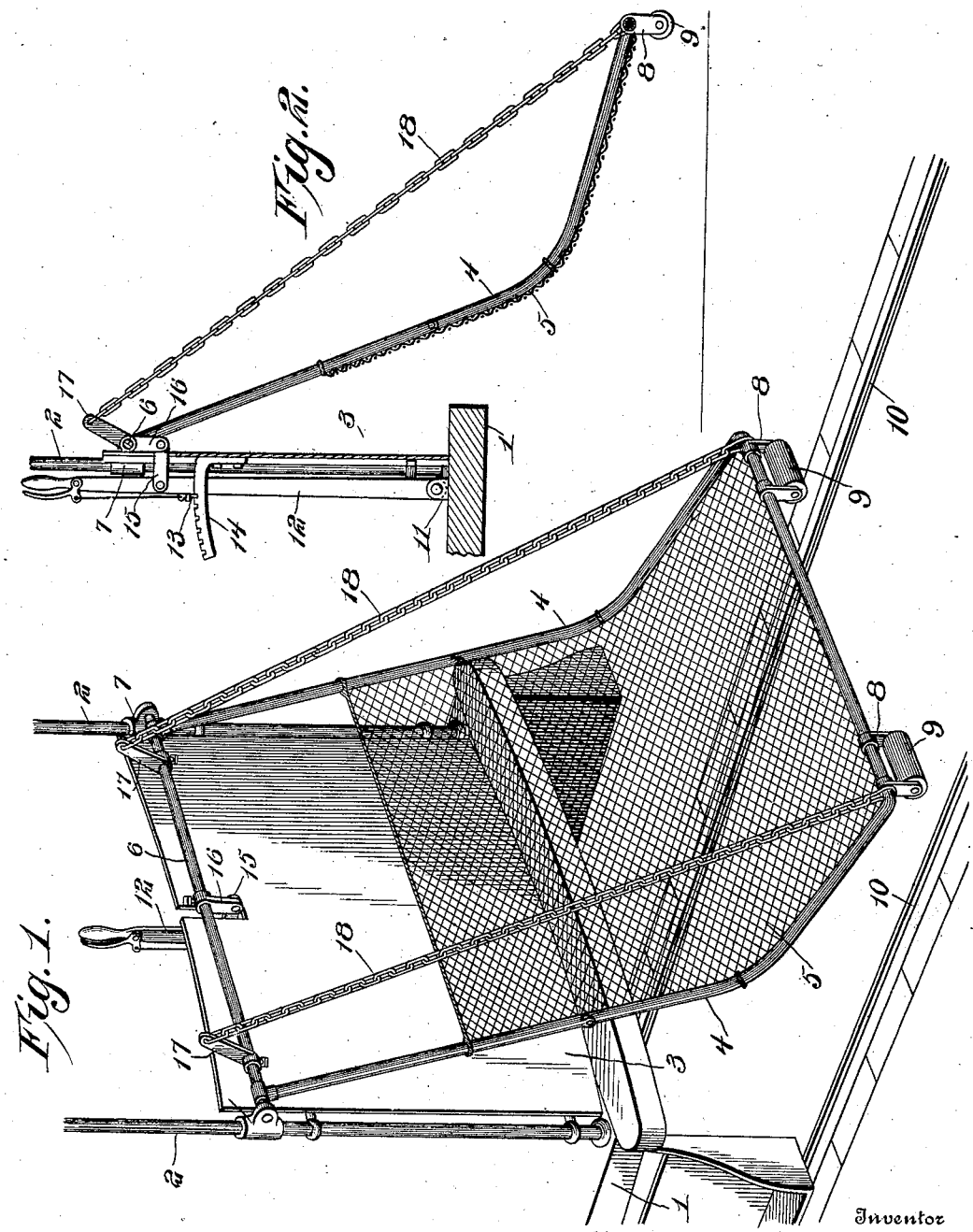
Witnesses
Louis R. Heinrichs
P. S. Elmore
Inventor
Thomas J. Sayers
By Victor J. Evans
Attorney

UNITED STATES PATENT OFFICE.

THOMAS J. SAYERS, OF WEST PHILADELPHIA, PENNSYLVANIA.

CAR-FENDER.

No. 853,123.  Specification of Letters Patent.  Patented May 7, 1907.

Application filed October 13, 1906. Serial No. 338,829.

*To all whom it may concern:*

Be it known that I, THOMAS J. SAYERS, a citizen of the United States, residing at West Philadelphia, in the county of Philadelphia and State of Pennsylvania, have invented new and useful Improvements in Car-Fenders, of which the following is a specification.

This invention relates to car fenders of the type employed on street railway cars, being directed especially to the mechanism for raising and lowering the forward end of the fender, and has for its objects to provide a comparatively simple, inexpensive device of this character which may be readily installed for use, one whereby the fender will be normally sustained in elevated condition above the rails, and one whereby the fender may be quickly lowered onto the rails when circumstances require.

With these and other objects in view, the invention comprises the novel features of construction and combination of parts more fully hereinafter described.

In the accompanying drawings: Figure 1 is a perspective view of a fender embodying the invention and showing the same applied for use. Fig. 2 is a vertical, longitudinal section taken centrally through the fender.

Referring to the drawings, 1 designates a car and forward platform of a car equipped with vertical stanchions 2 to which is attached a dash board 3, these parts being of the usual or any appropriate construction and material and adapted in practice to perform their ordinary functions.

Arranged in advance of the car is a fender comprising a substantially U-shaped frame 4 in which is arranged a net 5 composed of wire or other suitable material, the side bars of the fender frame being pivoted at their upper ends on a horizontal rock shaft 6 extended above the top of the dash board 3 and journaled at its ends in bearings 7 fixed on the stanchions 2, while fixed upon the front lower horizontal bar of the frame 4 are suitable bearings 8 in which are journaled anti-friction rollers 9 disposed to travel on the underlying rails 10 when the fender is lowered as hereinafter explained.

Pivoted at its lower end in a bearing 11 on the platform is a vertical operating lever 12 provided with a pawl 13 adapted for engagement with a horizontal rack 14 attached to and projecting rearwardly from the dash board 3, the lever being connected between its ends by means of a link 15 with the lower end of a vertically depending crank arm 16 fixed upon the rock shaft 6 upon which there is also fixed a pair of upwardly and forwardly inclined crank arms 17 having their outer ends connected by flexible connecting elements or chains 18 with the front lower bar of the fender frame 4.

In practice, the parts stand normally in the position illustrated with the forward end of the fender elevated above the rails 10 and maintained in such position through engagement of the pawl 13 with the rack 14, it being evident that under these conditions the weight of the fender will be borne chiefly by the elements 18. When it is desired to lower the forward end of the fender the pawl is freed from the rack and the upper end of the lever 12 swung rearwardly, thereby acting through the medium of link 15 and crank arm 16 to rock the shaft 6 in the direction indicated by the arrow in Fig. 1 to swing the crank arms 17 downward to permit the forward end of the fender to descend, it being evident that when the fender is lowered to active position the rollers 9 will travel on the respective rails 10 for relieving friction between the parts.

In the operation of receiving the fender the upper end of lever 12 will be swung forwardly, thus reversing the direction of rotation of shaft 6 and causing the arms 17 to act through the medium of the chains 18 for lifting the fender.

Having thus described my invention, what I claim is:

1. In a device of the class described and in combination with a car, a rock shaft journaled thereon and provided with crank arms, a fender hung upon said shaft, an operating lever, connections between the lever and shaft for rocking the latter, and connections between the crank arms and forward portion of the fender.

2. In a device of the class described and in combination with a car, a rock shaft journaled thereon, a fender hung upon said shaft, and for movement at its lower end in a vertical plane, crank arms fixed upon said shaft, connecting elements extended between said arms and the lower end of the fender, an operating lever and connections between said lever and the shaft for rocking the latter.

3. In a device of the class described and in combination with a car, of a rock shaft journaled thereon and provided with a pair of upwardly projecting crank arms, a fender hung on said rock shaft for movement at its lower end in a vertical plane, connecting elements extended between the outer ends of the crank arms and lower end of the fender, a depending crank arm fixed on the rock shaft, an operating lever, a link connection between said lever and the last named crank arm, and means for locking the lever against movement.

In testimony whereof, I affix my signature in presence of two witnesses.

THOMAS J. SAYERS.

Witnesses:
SAMUEL C. KANE,
ALBERT M. FREE.